(12) United States Patent  
Green et al.

(10) Patent No.: US 8,947,430 B1  
(45) Date of Patent: Feb. 3, 2015

(54) SYSTEM AND METHOD FOR RENDERING A PARTICLE-BASED FLUID SURFACE

(75) Inventors: Simon Green, Theale (GB); Miguel Sainz, Theale (GB); Wladimir Van Der Laan, Theale (GB)

(73) Assignee: NVIDIA Corporation, Santa Clara, CA (US)

( * ) Notice: Subject to any disclaimer, the term of this patent is extended or adjusted under 35 U.S.C. 154(b) by 932 days.

(21) Appl. No.: 12/713,910

(22) Filed: Feb. 26, 2010

(51) Int. Cl.
  *G06T 15/50* (2011.01)
(52) U.S. Cl.
  USPC .......................................................... 345/426
(58) Field of Classification Search
  USPC .......................................................... 345/426
  See application file for complete search history.

(56) References Cited

U.S. PATENT DOCUMENTS

2007/0024620 A1   2/2007   Muller-Fischer et al.

OTHER PUBLICATIONS

H. Cords and O. Staadt. Interactive screen-space surface rendering of dynamic particle clouds. Journal of Graphics, GPU & Game Tools (JGT), 14(3):1-19, 2009.*
Bridson, R., "Fluid Simulation for Computer Graphics," A K Peters, Ltd., 2008, pp. 1-219.
Liu, G. R. et al., "Smoothed Particle Hydrodynamics: A Meshfree Particle Method," World Scientific, 2003, pp. 1-449.
Lorensen, W. E. et al., "Marching Cubes: A High Resolution 3D Surface Construction Algorithm," Computer Graphics, 1987, vol. 21, No. 4, pp. 163-169.
Malladi, R. et al., "Level Set Methods for Curvature Flow, Image Enhancement, and Shape Recovery in Medical Images," In Proceedings of Conference on Visualization and Mathematics, 1995, pp. 329-345.
Perlin, K., "An Image Synthesizer," SIGGRAPH Computer Graphics, vol. 19, No. 3, Jul. 22-26, 1985, pp. 287-296.
Rosenberg, I. D. et al., "Real-Time Particle Isosurface Extraction," I3D 2008, 2008, pp. 35-44.
Adams,B. ,Lenaerts, T., and Dutre,P. 2006.Particle splatting: Interactive rendering of particle-based simulation data. Tech. Rep. CW 453, Department of Computer Science, K. U. Leuven, July.
Aurich, V., and Weule, J. 1995. Non-linear gaussian filters performing edge preserving diffusion. In DAGM-Symposium, 538-545.
Botsch, M., Hornung, A., Zwicker, M., and Kobbelt, L. 2005. High-quality surface splatting on today's GPUs. In Proceedings Eurographics/IEEE VGTC Symposium Point-BasedGraphics,IEEE Computer Society, Los Alamitos, CA, USA, 17-141.
Chen, J., Paris, S., and Durand, F. 2007. Real-time edge-aware image processing with the bilateral grid. In SIGGRAPH '07:ACM SIGGRAPH 2007 papers,ACM, New York,NY, USA, 103.
Clavet, S., Beaudoin, P., and Poulin, P. 2005. Particle-based viscoelastic fluid simulation. In Symposium on Computer Animation 2005,219-228.
Cords,H., and Staadt,O. 2008. Instant liquids. In Poster Proceedings of ACM Siggraph/Eurographics Symposium on Computer Animation.

(Continued)

*Primary Examiner* — Kee M Tung
*Assistant Examiner* — Peter Hoang
(74) *Attorney, Agent, or Firm* — Zilka-Kotab, PC

(57) ABSTRACT

A method for rendering a particle-based fluid surface includes generating a depth image of a plurality of particles which form a fluid surface, and smoothing the depth image to generate a smoothed depth image. From the smoothed depth image, a smoothed surface position and a smoothed surface normal for each of a plurality of pixels included within the smoothed depth image is determined, and a shaded surface of the fluid is rendered as a function of the smoothed surface positions and the smoothed surface normals.

21 Claims, 5 Drawing Sheets

(56) References Cited

OTHER PUBLICATIONS

Desbrun,M., and Gascuel,M. P. 1996. Smoothed particles : A new paradigm for animating highly deformable bodies. In Computer Animation and Simulation '96, 61-76.

Johanson, C. 2004. Real-time water rendering -introducing the projected grid concept. Master's thesis, Department of Computer Science, Lund University.

Mueller, M., Schirm, S., and Duthaler, S. 2007. Screen space meshes. In SCA '07: Proceedings of the 2007ACM SIGGRAPH/Eurographics symposium on Computer animation, Eurographics Association, Aire-la-Ville, Switzerland, Switzerland, 9-15.

Smereka,P. 2003. Semi-implicitlevel set methods for curvature and surface diffusion motion. J. Sci. Comput. 19,1-3, 439-456.

Stora, D., Agliati, P. O., Cani, M. P., Neyret, F., and Gascuel,J.-D. 1999. Animating lava flows. In Graphics Interface, 203-210.

Williams, B. W. 2008. Fluid Surface Reconstruction from Particles. Master's thesis, The University of British Columbia.

Yanci Zhang, Barbara Solenthaler, R. P. 2008. Adaptive sampling and rendering of fluids on the gpu. In Proc. of Symposium on Point-Based Graphics, 137-146.

Zhang,Y., and Pajarola,R. 2007. Deferred blending: Image composition for single-pass point rendering. Computers&Graphics 31, 2, 175-189.

\* cited by examiner

SYSTEM AND METHOD FOR RENDERING A PARTICLE-BASED FLUID SURFACE

BACKGROUND

The present invention relates generally to systems and methods for graphics rendering, and more particularly to a system and method for rendering a particle-based fluid surface.

For interactive scenes, particle-based fluid simulation methods like Smoothed-Particle Hydrodynamics (or SPH) are commonly preferred to grid-based fluid simulation methods. Particle-based fluid representation permits fluid flow throughout the scene without the need to define a grid over the scene area, which would be costly in memory and computation. It is also more convenient to integrate into existing physics infrastructure, as particles can collide against the scene geometry just like other objects.

However, a drawback with particle-based fluid simulation is it is difficult to extract a surface for rendering. In some conventional techniques, the fluid surface is constructed in world-space, either as a mesh directly or as an implicit surface, and then polygonized using Marching Cubes or other similar methods. After this, relaxation and optimization operations can be applied to the entire mesh to reduce the bumpiness of the surface, which is computationally and memory intensive.

Likewise, implicit surface polygonization methods also suffer from grid discretization artifacts in frame-to-frame coherence, as the grid is static and does not move with the fluid. This is especially visible at low-resolution grids, whereas using high-resolution grids can prohibit real-time visualizations, because evaluating the metaball densities at each grid point is expensive. For acceptable visual quality, the grid must be much finer than the particle spacing. The need for a fixed grid also restricts the fluid to a box, whereas not having this restriction is one of the reasons for choosing particle-based fluid surface rendering.

Accordingly, a new particle-based fluid surface rendering technique is needed to overcome the aforementioned disadvantages.

SUMMARY

The present invention provides an improved technique for rendering particle-based fluid surfaces. Among the embodiments of the present invention, a method for rendering a particle-based fluid surface is included, this method including generating a depth image of a plurality of particles which form a fluid surface, and smoothing the depth image to generate a smoothed depth image. From the smoothed depth image, a smoothed surface position and a smoothed surface normal for each of a plurality of pixels included within the smoothed depth image is determined, and a shaded surface of the fluid is rendered as a function of the smoothed surface positions and the smoothed surface normals.

These and other aspects of the invention will be better understood in light of the following drawings and detailed description of exemplary embodiments.

For clarity, previously-defined features retain their reference indicia in subsequent drawings.

DETAILED DESCRIPTION OF EXEMPLARY EMBODIMENTS

Figure 1:
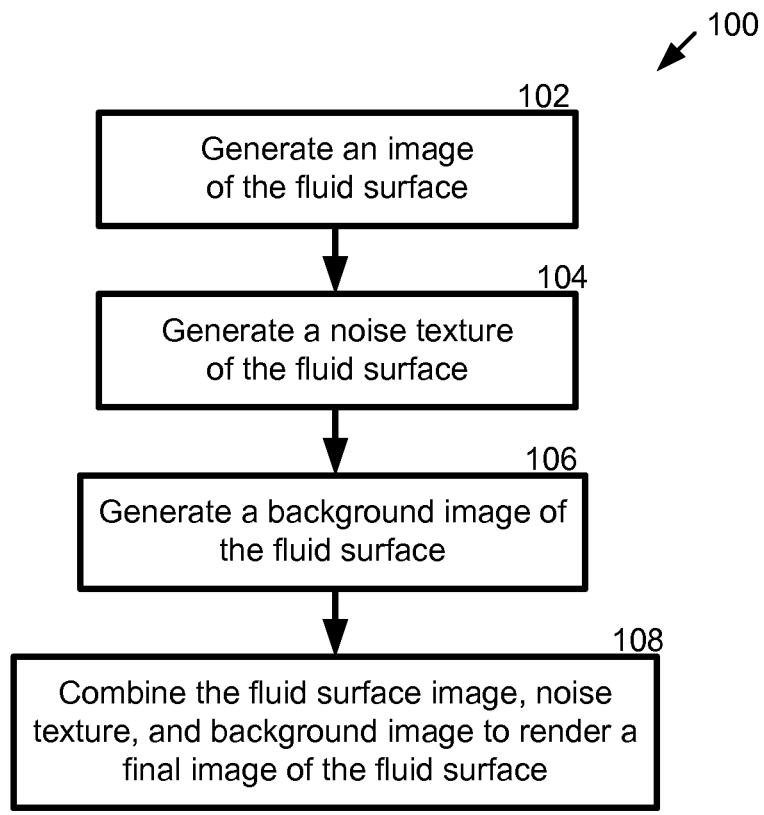
FIG. 1 illustrates a first exemplary method for rendering a particle-based fluid surface in accordance with the present invention.

FIG. 1 illustrates a first exemplary method for rendering a particle-based fluid surface in accordance with the present invention. The method 100 commences at operation 102 where an image of the fluid surface is generated. At 104, a noise texture of the fluid surface is generated. At 106, a background image, corresponding to scene data located view-wise behind the fluid surface is generated. At 108, the fluid surface image, the noise texture, and the background image are employed to form a final image of the fluid surface. The final image may be displayed or written to a render target.

Exemplary embodiments of operations 102, 104 and 108 are further described below. Exemplary of operation 106, scene data residing view-wise behind the fluid surface is written to a buffer/render target where it is stored as a background image for use in operation 108. The background image, referred to as S(x,y) as described herein, can be used to determine the color of the fluid surface, depending upon, e.g., the color and thickness of the fluid surface, as described below. Further particularly, the texture coordinates used to sample the background image may be perturbed based upon the normal n of the fluid surface in order to give the illusion of refracting the object behind the fluid. These and other aspects of the background image are described in greater detail below.

Image of the Fluid Surface

Figure 2:
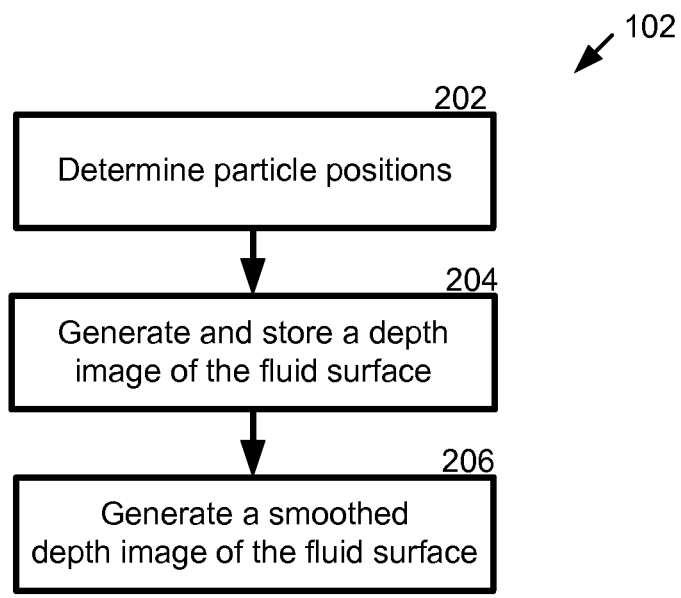
FIG. 2 illustrates an exemplary embodiment of generating an image of a particle-based fluid surface in accordance with the method of FIG. 1

FIG. 2 illustrates an exemplary embodiment of operation 102 in which an image of the particle-based fluid surface is generated in accordance with the method of FIG. 1. At 202, positions of the particles which make up the fluid surface are determined. Exemplary, the positions of the near-most (view-wise) particles of the fluid surface are determined. Such a determination may be performed, for example, using a smoothed-particle hydrodynamics (SPH) simulation which produces a three-dimensional point cloud of positions $x_i$ of particles $p_i$, $i \in \{0 \ldots n\}$ in any order. Alternatively, the particles may be defined as having an associated density $\rho_i$ and velocity $v_i$ coming from the SPH simulation. It will be understood that any technique operable to determine particle positions of a fluid surface may be used in accordance with the present invention.

Depth Image

At 204, a depth image of the fluid surface (e.g., a depth map) is generated and stored in a buffer (render target). In one embodiment, a depth image of the fluid surface is generated, whereby the near-most (view-wise) surface of the fluid is determined, and the particles along that surface are rendered with a corresponding a depth/z-value. For example, the aforementioned SPH algorithm may be employed to determine the positions of the particles, and those particles may then be splatted onto the screen. A render target for the surface depth is initialized with a predefined depth value representing a very large depth (i.e., furthest most surface). For each pixel, the depth value for the near-most particle is retained, with the current depth value being overwritten by a depth value corresponding to a particle which is closer to the camera/view point. After the particles are rendered, the render target will contain the depth to the viewer of the nearest particle for each pixel in the viewport.

The particles identified in operation 102 may be rendered as spheres, or alternatively, as "point sprites", a feature that is provided by OpenGL, Direct3D and other 3D graphics application programming interfaces. As used herein, a point sprite refers to a screen-oriented quad. Further particularly, the depth/z-value of the point sprite is varied within the fragment shader according to the equation:

$$d(x,y) = \sqrt{1 - x^2 - y^2} \quad \text{eq. (1)}$$

where x and y varies between unit values −1 and +1 over a two dimensional screen space position of the particle and d(x,y) is the depth value of the particle output from the fragment shader. The size of the point sprite is computed by applying projective transformation, so that the size is constant in world-space. Rendering the particles as point sprites requires significantly less computation with little degradation in the quality of the computation compared to rendering the particles as geometrically-correct spheres. When a particle is rendered as a point sprite, the corresponding depth/z-value of the point sprite is according to the equation:

$$z(x, y) = \min_{i=0}^{n} z_i + d\left(\frac{x - x_i}{\sigma_i}, \frac{y - y_i}{\sigma_i}\right) \quad \text{eq. (2)}$$

where d is the kernel function shown in eq. (1), $x_i$, $y_i$ and $z_i$ are the projected (view space) position of the particle, and $\sigma_i$ is its projected size. The depth/z-values values (the collection of which forms the depth image) are written to a corresponding render target. The depth image generated by eq. (2) is used in the subsequent smoothing operations, as will be shown below.

Optionally, stray particles may be excluded from rendering, as they do not form part of the fluid surface. This effect can be accomplished by applying a threshold on the density $\rho_i$ obtained from the simulation, and rendering the low density particles separately from the fluid surface as spray to make the transition smoother.

Smoothed Depth Image

Operation 206 represents a process, whereby the depth image of the fluid surface generated in operation 204 is smoothed. Smoothing the depth image of the fluid surface hides the spherical nature of the particles so that the surface does not appear unnaturally blobby or jelly-like. In one embodiment of this process, the smoothing operation includes Gaussian filtering, whereby a convolution of a Gaussian kernel is applied to the depth image provided in eq. (2). In such an embodiment, blending over silhouettes is minimized, and the amount of smoothing is varied as a function of the particle depth. Further exemplary, the kernel is substantially constant in width in world space. Further particular, bilateral Gaussian filtering is implemented, which, e.g., may be split into two one-dimensional passes.

Figure 3:
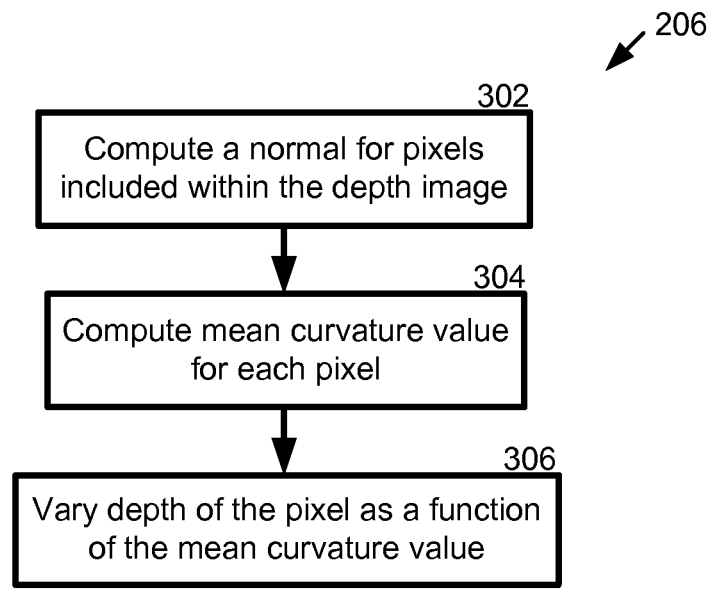
FIG. 3 illustrates an exemplary embodiment of generating a smoothed depth image of a particle-based fluid surface in accordance with the method of FIG. 2

FIG. 3 illustrates an alternative embodiment of operation 206 in which a smoothed depth image is generated. In this embodiment, referred to as a screen-space curvature flow technique, the depth value of the pixels in the original depth image are varied in proportion to a mean curvature value corresponding computed locally for each pixel in the depth image. Exemplary, the particles upon which the smoothing operations are performed are the particles of the depth image per operation 204 and eq. (1) above.

According to the method 300, at 302 a normal is computed for each pixel included in the depth image generated at 204. At 304, a mean curvature value is computed at each of the pixels, and at 306, the depth of the pixel is varied as a function of the mean curvature value corresponding to said pixel.

Exemplary of operation 302, a normal for each pixel of the fluid surface image is computed, whereby a projection transformation of a pixel is inverted to map a value in the depth buffer to a point P in view space, where $V_x$ and $V_y$ are the dimensions of the viewport, and $F_x$ and $F_y$ is the focal length in x and y direction, respectively:

$$P(x, y) = \begin{pmatrix} \frac{\frac{2x}{V_x} - 1.0}{F_x} \\ \frac{\frac{2y}{V_y} - 1.0}{F_x} \\ 1 \end{pmatrix} z(x, y) \quad \text{eq. (3)}$$

The normal is calculated by taking cross product between the derivatives of P in x and y direction.

$$n(x, y) = \frac{\partial P}{\partial x} \times \frac{\partial P}{\partial y} = \quad \text{eq. (4)}$$

$$\begin{pmatrix} C_x z + W_x \frac{\partial z}{\partial x} \\ W_y \frac{\partial z}{\partial x} \\ \frac{\partial z}{\partial x} \end{pmatrix} \times \begin{pmatrix} W_x \frac{\partial z}{\partial x} \\ C_y z + W_y \frac{\partial z}{\partial y} \\ \frac{\partial z}{\partial x} \end{pmatrix} \approx \begin{pmatrix} C_x z \\ 0 \\ \frac{\partial z}{\partial x} \end{pmatrix} \times \begin{pmatrix} 0 \\ C_y z \\ \frac{\partial z}{\partial y} \end{pmatrix} =$$

$$\begin{pmatrix} -C_x \frac{\partial z}{\partial x} \\ -C_y \frac{\partial z}{\partial y} \\ C_x C_y Z \end{pmatrix} z$$

in which:

$$C_x = \frac{2}{V_x F_x}, \; C_y = \frac{2}{V_y F_y}, \; W_x = \frac{\frac{2x}{V_x} - 1.0}{F_x}, \; W_y = \frac{\frac{2y}{V_y} - 1.0}{F_y} \quad \text{eq. (5)}$$

The terms of the derivatives of P that depend on the view position $W_x$ and $W_y$ may be ignored because this assumption results in almost no visual difference in rendering, and simplifies the following computations significantly. By normalizing n(x,y), the unit normal is obtained:

$$\hat{n}(x,y) = \frac{n(x,y)}{|n(x,y)|} = \frac{\left(-C_x \frac{\partial z}{\partial x} - C_y \frac{\partial z}{\partial y} C_x C_y z\right)^T}{\sqrt{C_x^2 \frac{\partial z^2}{\partial x} + C_y^2 \frac{\partial z^2}{\partial y} + C_x^2 C_y^2 z^2}} \quad \text{eq. (6)}$$

Exemplary of operation 304, the mean curvature H is defined as the divergence of the unit normal of a surface:

$$2H = \nabla \cdot \hat{n} \quad \text{eq. (7)}$$

The z component of the divergence is zero, as z is a function of x and y, and thus doesn't change when these are kept constant.

$$2H = \frac{\partial \hat{n}_x}{\partial x} + \frac{\partial \hat{n}_y}{\partial y} = \frac{C_x E_x + C_y E_y}{D^{\frac{3}{2}}} \quad \text{eq. (8)}$$

in which:

$$D = C_x^2 \frac{\partial z^2}{\partial x} + C_y^2 \frac{\partial z^2}{\partial y} + C_x^2 C_y^2 z^2,\quad \text{eq. (9)}$$

$$E_x = -\frac{\partial z}{\partial x^2} D + \frac{\partial z}{\partial x}\left(C_x^2 \frac{\partial z}{\partial x}\frac{\partial z}{\partial x^2} + C_y^2 \frac{\partial z}{\partial y}\frac{\partial z}{\partial y^2} + C_x^2 C_y^2 z \frac{\partial z}{\partial x}\right) \quad \text{eq. (10)}$$

and $$E_y = -\frac{\partial z}{\partial y^2} D + \frac{\partial z}{\partial y}\left(C_x^2 \frac{\partial z}{\partial x}\frac{\partial z}{\partial x \partial y} + C_y^2 \frac{\partial z}{\partial y}\frac{\partial z}{\partial y^2} + C_x^2 C_y^2 z \frac{\partial z}{\partial y}\right) \quad \text{eq. (11)}$$

Exemplary of operation 306, the smoothing of the depth image is performed by varying the depth/z-value of the pixels in proportion to the local pixel's mean curvature H:

$$\frac{\partial z}{\partial t} = H \quad \text{eq. (12)}$$

wherein z is the depth/z-value of the pixel, t is time base over which changes in the mean curvature occur, and H is the mean curvature as computed in eq. (8). Exemplary, an Euler integration of eq. (12) in time is used to modify the z-values. Further exemplary, spatial derivatives of az are computed using finite differencing. Wherever the surface is discontinuous because of silhouettes in screen-space, for example, when one body of fluid moves in front of another, blending of different patches of surface together may be prevented by enforcing boundary conditions where large changes in depth happen between one pixel and the next. The spatial derivatives can be forced to a zero value to prevent any smoothing from taking place at boundaries where large changes in depth happen between one pixel and the next and at the boundaries of the screen.

The foregoing operations 302, 304 and 306 may be repeated an arbitrary number of times depending on the smoothness that is desired, wherein the obtained depth/z-value is successively modified to provide a smoother depth image. The number of iterations and smoothness obtained can be balanced against the cost of increased computation time for the added iterations.

The depth/z-values computed according to the foregoing are written to a render target (the collective depth/z-values referred to as the smoothed depth image) as an intermediate result for forming a final image of the fluid in operation 108. In a particular embodiment, the render target used to store the depth image (eq. 2) is also used as the render target for the smoothed depth image, whereby the nearer/closer (viewwise) depth/z-values computed from the aforementioned smoothing operations overwrite the depth/z-values of the depth image.

Further exemplary of operation 102, from the smoothed depth image, a smoothed surface position and a smoothed surface normal are determined for one or more pixels included within the smoothed depth image. The smoothed surface position for a pixel can be ascertained from the depth image d(x,y) of the particles included within the screen space of that pixel by back-projecting the pixel coordinates (x,y) and its depth d(x,y). The smoothed surface normal n for a pixel can be determined by computing, for a particle which is overlaid by the pixel, the partial derivatives of the particle in the x and y directions, and computing the cross-product of the partial derivatives to compute the smoothed surface normal, as per eq. (6). When discontinuities occur in the fluid surface, using the finite differences in only one direction can result in artifacts along the silhouettes. When the difference in depth is greater than a predefined threshold, that is when a discontinuity is detected, the smallest absolute finite difference is chosen in an exemplary embodiment. For example, the smallest of the quantities |z(x,y)−z(x+1,y)| and |z(x,y)−z(x−1,y)| is chosen.

Fluid Thickness

Operation 102 optionally includes computing a "thickness value" per pixel for the fluid surface image generated in operation 102 and modifying the fluid surface image based upon the thickness values of the pixels composing the fluid surface image. For example, the thickness values may be used to model the changes in the visibility or color of a background image over which the fluid is shown to flow.

Exemplary of this operation, the particles (identified in operation 202) are rendered as spheres using point sprites with a fixed size in world space. Depth test is enabled such that only particles in front of the scene geometry are rendered. The thickness value of a depth image pixel, the depth image pixel corresponding to a given particle, is computed according to the equation:

$$T(x,y) = \sum_{i=0}^{n} d\left(\frac{x - x_i}{\sigma_i}, \frac{y - y_i}{\sigma_i}\right) \quad \text{eq. (13)}$$

where d is the kernel function $d(x,y) = \sqrt{1 - x^2 - y^2}$ shown in eq. (1), in which x and y vary between −1 and +1 over the 2D screen-space position within the particle, n is the number of particles the computation is summed over, and where $x_i$ and $y_i$ are the projected (view space) position of the particle, and where $\sigma_i$ is the projected size. Additive blending (realized by the summation operation) is used to account for the accumulated amount of fluid at each position. Optionally, shading of the fluid is performed using a different exponential falloff for each color channel, so that the color of the fluid varies with the thickness. The thickness values may be used in generating the shaded fluid surface in operation 102, as described herein.

Noise Texture of the Fluid Surface

Exemplary, the noise texture in operation 104 may be generated using Perlin noise. In Perlin noise, a fractal noise texture is generated by adding multiple octaves of filter noise, where each octave is a filtered random function, and scales the amplitude and frequency with a factor dependent on the octave, $$fnoise(p) = \sum_{i=0}^{N-1} \alpha^i noise(2^i p) \qquad \text{eq. (14)}$$

in which the identifier noise is a deterministic noise function, N is the number of octaves, α is a constant between 0 and 1 that determines the roughness, and p is the coordinate to sample. Each particle projects one octave of noise, based on its identifier value, so that it remains with the particle. Additive blending is enabled, that results in noise texture in which the octaves move relative to each other, and to the flow.

Figure 4:
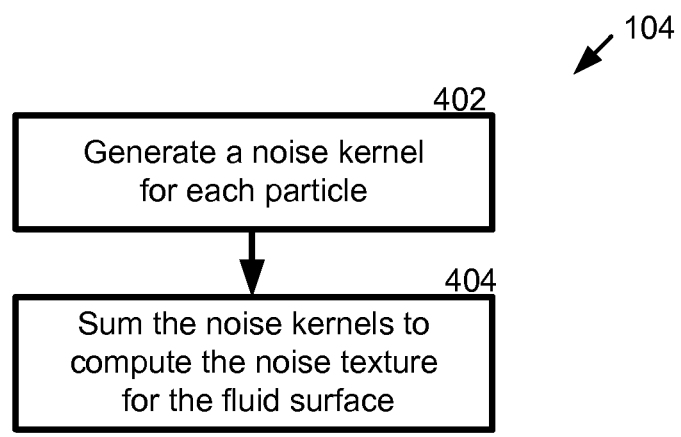
FIG. 4 illustrates an exemplary embodiment of generating a noise texture of a particle-based fluid surface in accordance with the method of FIG. 1.

FIG. 4 illustrates a further exemplary embodiment of operation 104 in which a noise texture for a fluid surface is generated. At 402, a noise kernel is generated for each particle of the fluid surface image generated in 102. At 404, the noise kernels are summed to compute a noise texture of the fluid surface. Exemplary, the fluid surface image for which the noise texture is generated is the depth image described above in operation 204, or the smoothed depth image described in operation 206.

Exemplary of operation 402, a point sprite is rendered with a Gaussian kernel to generate a point sprite value, and the point sprite value is multiplied by an exponent value, the exponent value based upon the depth of the particle below the fluid surface. For example, the noise kernel I(x,y) generated at 402 may be computed as:

$$I(x,y) = noise(x,y) e^{-x^2-y^2-(p \text{ is } z^{(x,y)-d(x,y)})^2} \qquad \text{eq. (15)}$$

where noise (x,y) is the Gaussian kernel, quantity p is the view space position of the particular pixel, quantity d represents the depth/z-value of the particle as sampled from the surface depth texture computed in eq. (1), and quantities x and y vary between −1 and +1. Further particularly, the noise texture is varied per particle to prevent patterns from becoming visibly apparent. A three-dimensional noise texture may be used for this, with the first two dimensions based on the position within the particle, and the third dimension based upon the particle identifier.

Exemplary of operation 404, the noise kernel in eq. (15) is summed for every particle on the screen to provide the noise texture N(x,y) for the fluid surface image:

$$N(x, y) = \sum_{i=0}^{n} I\left(\frac{x-x_i}{\sigma_i}, \frac{y-y_i}{\sigma_i}\right) \qquad \text{eq. (16)}$$

where the noise kernel function I(x,y) is as shown in eq. (15), in which x and y vary between −1 and +1 over the 2D screen-space position within the particle, n is the number of particles the computation is summed over, and where $x_i$ and $y_i$ are the projected (view space) position of the particle, and where $\sigma_i$ is the projected size.

Further exemplary of operation 404, the noise texture is generated such that the fluid surface appears more turbulent when the flow is fast or violent. This may be achieved by marking particles of the fluid surface image when a large change in velocity occurs. In particular, the velocity of a particle may be determined, and the amplitude of the noise texture for the particle is modulated based upon the particle's velocity. For example, particles may be marked, when the velocity $v_i$ particles change by more than a threshold value:

$$|v_i(t)-v_i(t-1)|>\tau \qquad \text{eq. (17)}$$

where τ is a threshold value. Above this change, the amplitude of the noise kernel in eq. (15) is varied (e.g., increased) to provide more pronounced fluid turbulence. Once the change in the particle's velocity falls below this threshold, the amplitude of the noise kernel may be reduced to provide the effect of less fluid turbulence. Of course, three or more different amplitude levels may be employed to provide different noise effects of the fluid surface image ranging from very still to extremely turbulent.

Fluid Surface Rendering

Referring again to FIG. 1, operation 108 may be performed by combining the fluid surface image, noise texture, and background image to form an image of the fluid surface, which may be rendered, e.g., as a full screen quad.

In one embodiment, the fluid surface image may be a depth image of the fluid surface or a smoothed version thereof, each as described above. Further exemplary, thickness values assigned to pixels of the fluid surface image may be used to modify visible properties of the fluid surface image. For example, the output color and transparency/opacity of the fluid surface may be based determined as a function of fluid thickness values. In a specific embodiment described below, the fluid surface image includes (i) a smoothed depth image to avoid a blobby or jelly-like fluid appearance, and (ii) fluid thickness values which permit additional control over rendering the fluid surface color as a function of the thickness of the fluid and other parameters as described below.

In a detailed implementation of operation 108, depth test is enabled when rendering the fluid surface image, and the depth returned by the fragment shader is read from the depth buffer produced when rendering the fluid surface image. This ensures that only particles in front of the scene geometry are rendered.

Normals of the fluid surface image in view-space n are calculated to shade the surface of the fluid, starting from the surface depth d(x,y). Further particularly, finite differences are used to calculate the partial derivatives in the x and y directions, then the normal is derived by taking the cross product of these (as per eq. (6)). When discontinuities occur in the fluid surface, using the finite differences in only one direction can result in artifacts along the silhouettes. When the difference in depth is greater than a predefined threshold, that is when a discontinuity is detected, the smallest absolute finite difference is chosen in an exemplary embodiment. For example, the smallest of the quantities |z(x,y)−z(x+1,y)| and |z(x,y)−z(x−1,y)| is chosen.

The noise texture N(x,y) is used to perturb the normals to add small, wave-like surface detail to the fluid, by adding the partial derivatives of N(x,y) to the calculated normals. In particular, the noise texture N(x,y) is used to modulate the normals of pixels which form the depth (or smoothed depth) image, thereby imparting a noisy or irregular appearance to the fluid surface. Further exemplary, a grayish color is added to the surface of the fluid to simulate a surface foam effect as a function of the magnitude of the noise N(x,y).

In a further exemplary embodiment, the thickness value T(x,y) is used to attenuate the refracted color of the fluid a, according to the equation:

$$a = \text{lerp}(C_{fluid}, S(x+\beta n_x, y+\beta n_y), e^{-T(x,y)}) \qquad \text{eq. (18)}$$

wherein $C_{fluid}$ is the color of the fluid (per pixel), S(x,y) is the background image, and T(x,y) is the thickness value of a pixel within the fluid surface as described in eq. (13), above. Quantity β increases linearly with the thickness, according to the equation:

$$\beta = T(x,y)\gamma \qquad \text{eq. (19)}$$

where γ is a constant that depends on the kind of fluid, and determines how much the background is refracted. The linear interpolation of eq. (18) allows the effects of a thicker fluid retaining its own color and less of the underlying background image color, and a thin fluid showing more of the background image color.

Exemplary, the optical properties of the fluid (per pixel) are based on the Fresnel equation, with a reflection and refraction component and a Phong shaded specular highlight, computing the output color of the fluid, $C_{out}$.

$$C_{out} = a(1 - F(n \cdot v)) + bF(n \cdot v) + k_s(n \cdot h)^\alpha \qquad \text{eq. (20)}$$

where F is Fresnel function, a is the refracted fluid color computed in eq. (18), b is the reflected scene color, $k_s$ and α are constants for the specular highlight, n is the surface normal, and h is the half-angle between the camera and the light, and v is the camera vector. The reflected color b can be determined by sampling a cube-map texture of the environment based on the reflected direction, and computed from the surface normal and the view vector.

Further exemplary of the operations 102-108, operations 102-106 may be performed at a first resolution, and operation 108 is performed at a second resolution. This arrangement allows a balancing of image rendering quality versus performance/speed. In a specific embodiment, operations 102-106 are performed at a lower resolution than that of the screen (for example, half or quarter resolution horizontally and vertically), and operation 108 is performed whereby the fluid is scaled up to the full resolution of the screen. Exemplary, the upscaling is integrated into the rendering step. Further exemplary, silhouettes are detected and process separately from the scaling, as applying a linear interpolation to them may result in invalid intermediate values. Inside the body of fluid, the depth is linearly interpolated, and the silhouettes are process separately therefrom. Further exemplary, the final shaded color is blended and computed at a low resolution over edges instead of the normal or depth value, thus providing a smoothing effect for the silhouettes.

Figure 5:
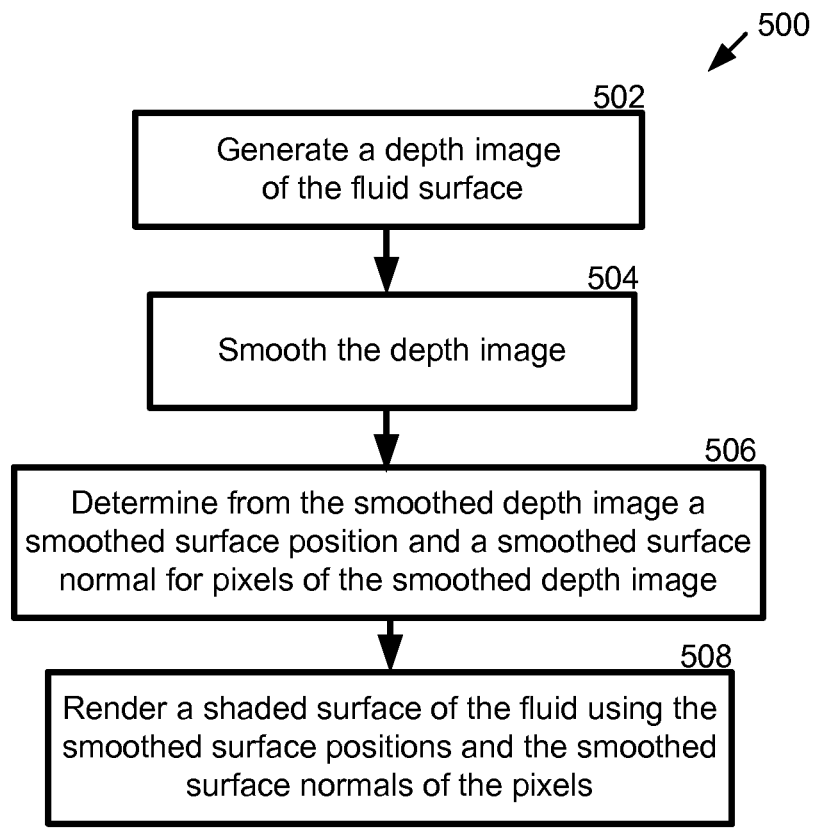
FIG. 5 illustrates a second exemplary method for rendering a fluid surface in accordance with the invention.

FIG. 5 illustrates a second exemplary method 500 for rendering a particle-based fluid surface in accordance with the invention. At 502, a depth image of a plurality of particles forming a fluid surface is generated. At 504, the depth image is smoothed, the smoothed depth image including a plurality of pixels, each pixel corresponding to one or more particles of the fluid surface. At 506, from the smoothed depth image, a smoothed surface position and a smoothed surface normal for each of the plurality of pixels included within the smoothed depth image are determined. At 508, a shaded surface of the fluid is rendered (displayed, written to a render target, etc.) as a function of the smoothed surface positions and smoothed surface normals of the pixels in the smoothed depth image.

Exemplary of operation 502, point sprites are supplied to a shader, the shader operable to generate depth values. For example, operation 502 can be carried out in accordance with operations 202 and 204 described above in which an SPH algorithm is used to determine the particle positions, the particles splatted onto the screen, and a render target is initialized with a predefined depth value representing a very large depth (i.e., furthest most surface). The particles may be rendered as point sprites, in which case the depth/z-value of the point sprite is varied within the fragment shader according to the eq. (1). Alternatively, the particles may be rendered as geometric spheres.

Exemplary of operation 504, a filtering process may be applied to the depth image. Further specifically, the bilateral Gaussian filtering process may be applied to the depth image, as described above. In another embodiment, the above described screen-space curvature technique may be applied to smooth the depth image of the fluid surface.

Exemplary of operation 506, the smoothed surface position for a pixel can be ascertained from the depth image d(x,y) of the particles included within the screen space of that pixel by back-projecting the pixel coordinates (x,y) and its depth d(x, y). Further exemplary of operation 506, a smoothed surface normal n for a pixel is determined by computing, for a particle which is overlaid by the pixel, the partial derivatives of the particle in the x and y directions, and computing the cross-product of the partial derivatives to compute the smoothed surface normal, as per eq. (6). When discontinuities occur in the fluid surface, using the finite differences in only one direction can result in artifacts along the silhouettes. When the difference in depth is greater than a predefined threshold, that is when a discontinuity is detected, the smallest absolute finite difference is chosen in an exemplary embodiment. For example, the smallest of the quantities |z(x,y)−z(x+1,y)| and |z(x,y)−z(x−1,y)| is chosen.

Exemplary of operation 508, a shaded fluid surface is rendered using the smoothed particle positions and the smoothed particle normals n determined from operation 506. Further specifically, the operations and computations illustrated for eq. (20) are used to render the shaded fluid surface. The fluid surface's output pixel described by eq. (20) includes input arguments n, which corresponds to the pixel's smoothed surface normal, and v (camera vector) which corresponds to the pixel's smoothed surface position.

Figure 6:
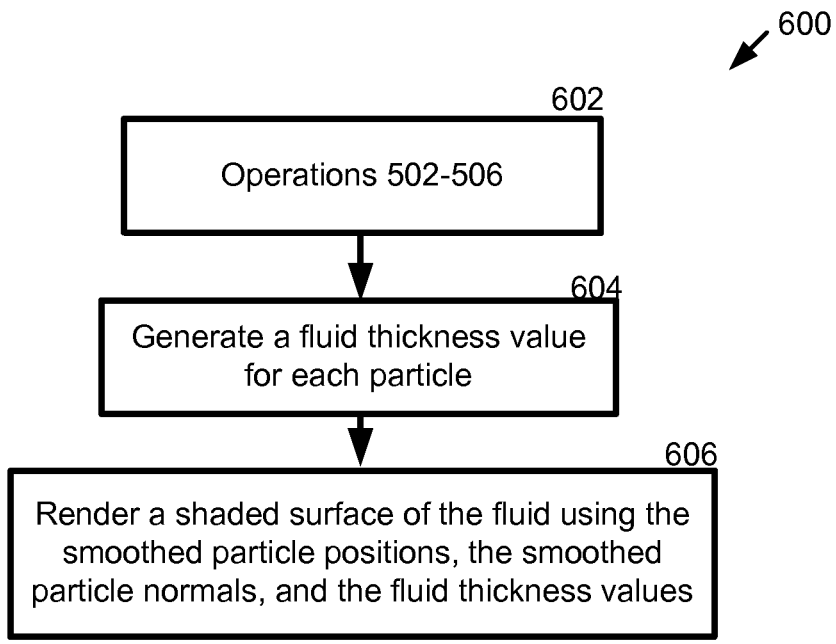
FIG. 6 illustrates a third exemplary method for rendering a fluid surface in accordance with the invention.

FIG. 6 illustrates a third exemplary method 600 for rendering a fluid surface in accordance with the invention. In this embodiment, operation 602 includes performing the operations of 502-506, specifically generating a depth image for the fluid surface, smoothing the depth image, and determining, from the smoothed depth image, smoothed surface positions and smoothed surface normals for pixels included therein.

At 604, a fluid thickness value is generated for each of the pixels of the smoothed depth image. Exemplary of this operation, the fluid thickness values are computed in accordance with eq. (13) above.

At 606, a shaded surface of the fluid is rendered (displayed, written to a render target, etc.) as a function of the smoothed surface positions, smoothed surface normals, and the fluid thickness values. Exemplary of this operation, the shaded fluid surface is rendered using the operations and computations illustrated for eqs. (18), (19), and (20), above.

Figure 7:
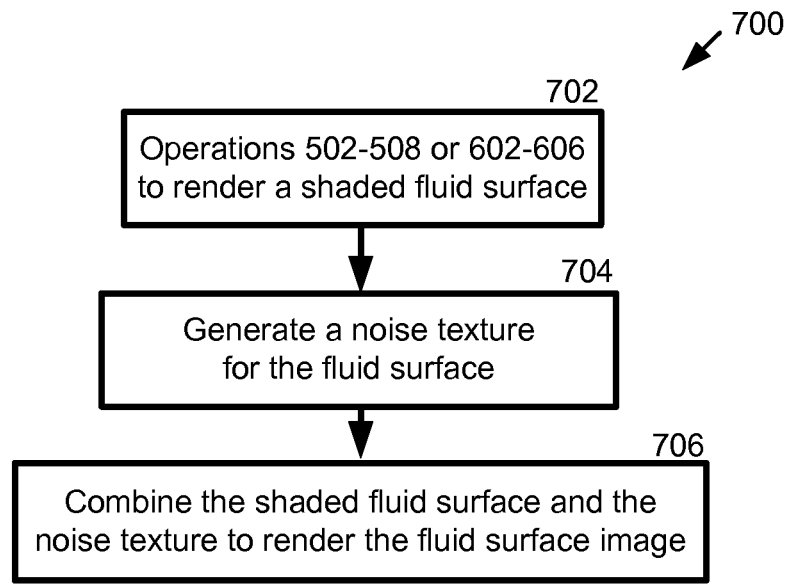
FIG. 7 illustrates a fourth exemplary method of rendering a fluid surface in accordance with the present invention.

FIG. 7 illustrates a fourth exemplary method 700 for rendering a fluid surface in accordance with the present invention. In this embodiment, operation 702 includes rendering a shaded fluid surface in accordance with either the afore-described operations of 502-508 whereby the shaded fluid surface rendered is without fluid thickness values, or in accordance with operations 602-606 whereby the shaded surface is rendered with fluid thickness values. At operation 704, a noise texture for the fluid surface is generated. Exemplary of this operation, operations 104, and more specifically operations 402 and 404 may be performed. At 706, the noise texture is combined (e.g., composited) with the shaded fluid surface to render (displayed, written to a render target, etc.) an image of the fluid surface. In this embodiment, the rendered fluid surface will include the additional noise texture, thus providing additional visual complexity and realism to the image.

Figure 8:
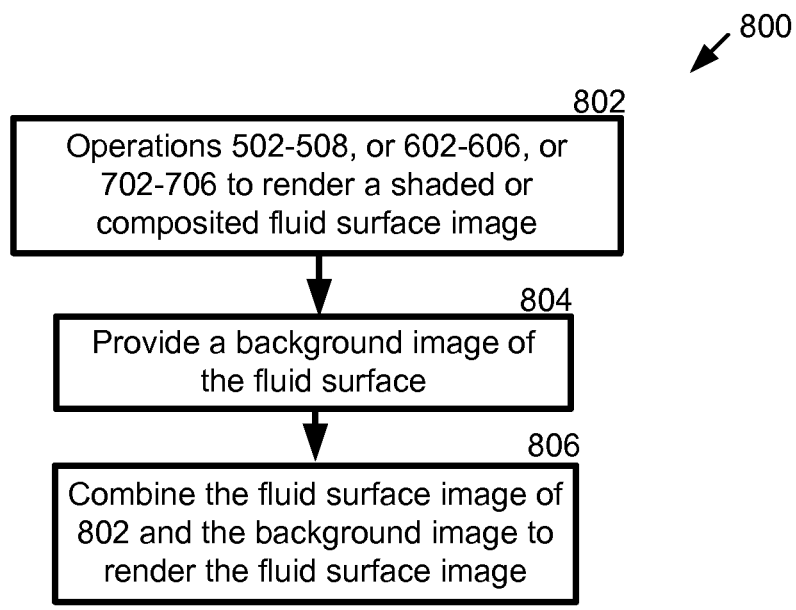
FIG. 8 illustrates a fifth exemplary method for rendering a fluid surface in accordance with the present invention.

FIG. 8 illustrates a fifth exemplary method 800 for rendering a fluid surface in accordance with the present invention. In this embodiment, operation 802 includes rendering a shaded fluid surface in accordance with either the afore-described operations of 502-508 or 602-606, or a composited fluid surface image in accordance with operations 702-706, in which the shaded fluid surface is composited with a noise texture of the fluid surface. At 804, a background image of the fluid surface is provided, an exemplary embodiment for which is according to operation 106, above. At 806, the fluid surface rendering obtained in operation 802 is combined with the background image of the fluid surface to render (displayed, written to a render target, etc.) an image of the fluid surface. An exemplary embodiment of this operation is as described in operation 108, above.

Figure 9:
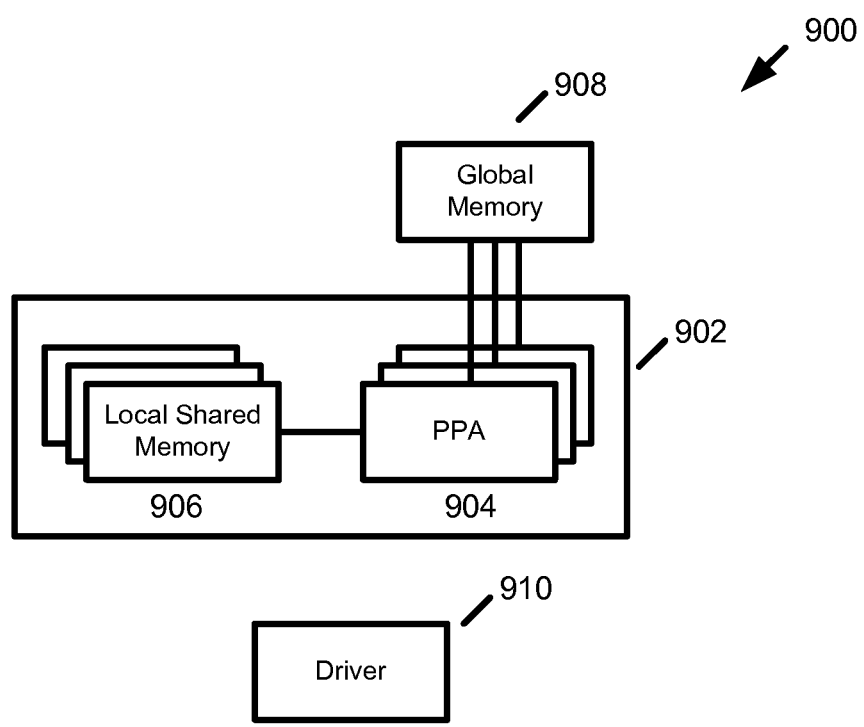
FIG. 9 illustrates an exemplary system operable to perform the operations illustrated in FIGS. 1-8 in accordance with the present invention.

FIG. 9 illustrates an exemplary system 900 operable to perform one or more of the operations illustrated in FIGS. 1-8 in accordance with the present invention. System 900 includes a processor 902, which includes a plurality of parallel processing architectures 904, each configured to operate on a predetermined number of threads. Accordingly, each parallel processing architecture 904 may operate in parallel, while the corresponding threads may also operate in parallel. In a particular embodiment, the parallel processing architecture 904 is a single instruction multiple data (SIMD) architecture of a predefined SIMD width, for example 32, 64, 128, 256 or more threads.

The processor 902 may further include local shared memory 906, which may be physically or logically allocated to a corresponding parallel processing architecture 904. The system 900 may additionally include a global memory 908 which is accessible to each of the parallel processing architectures 904. The system 900 may further include one or more drivers 910 for controlling the operation of the processor 902 in accordance with the methods of FIGS. 1-8. The driver(s) 510 may include one or more libraries for facilitating control of the processor 902. In one embodiment, the system 900 is included within in a graphics card. In another embodiment, the system 900 is included within the motherboard of an imaging system, e.g., a digital camera. The system 900 may be implemented in other components, for example, a computer or a game console, or in an embedded system, such as in a cellular telephone or internet device.

The processor circuitry of the processor 902 is operable to perform (e.g., execute instructions to carry out) any of the operations illustrated in FIGS. 1-8 herein. In an embodiment exemplified by FIG. 1, circuitry of processor 902 (herein "processor circuitry") is operable to generate an image of the fluid surface, a noise texture of the fluid surface, and a background image of the fluid surface, and to combine these into a final image.

In an embodiment exemplified by FIG. 2, the processor circuitry is operable to determine positions of particles making up the fluid, generate and store a depth image of the fluid based upon the determined particle positions, and generate and store a smoothed depth image of the fluid surface based upon the depth image. Further optionally, the processing circuitry is operable to generate thickness values of the fluid based upon the determined particle positions.

In an embodiment exemplified by FIG. 3, the processor circuitry is operable to compute a normal for particles included within the depth image, compute a mean curvature value for each particle, and vary the depth value of the particle as a function of the mean curvature value corresponding to that particle. In an embodiment exemplified by FIG. 4, the processor circuitry is operable to generate a noise kernel for each particle, and sum the noise kernels to compute a noise texture for the fluid surface. In a further exemplary embodiment, the processor includes processor circuitry operable to perform operations 102-106 at a first rate of resolution for the images formed thereby, and processing circuitry operable to perform operation 108 at a second rate of resolution for the composite image formed thereby, the first and second resolution rates being different. In a particular embodiment the first resolution rate is lower than the second resolution rate.

In an embodiment exemplified by FIG. 4, the processor circuitry is operable to generate a noise kernel for each particle, and to sum the noise kernals over for a plurality of particles to compute a noise texture for the fluid surface.

In an embodiment exemplified by FIG. 5, the processor circuitry is operable to generate a depth image of the fluid surface, smooth the depth image, determine a smoothed particle position and a smoothed particle normal for particles in the smoothed depth image, and render a shaded fluid surface using the smoothed particle positions and smoothed particle normals.

In an embodiment exemplified by FIG. 6, the processor circuitry is operable to perform operations 502-506, generate a fluid surface thickness value for each particle of the smoothed depth image, and render a shaded fluid surface based upon the smoothed particle positions and normals, and the fluid surface thickness values.

In an embodiment exemplified by FIG. 7, the processor circuitry is operable to perform operations 502-508 or 602-606 to render a shaded fluid surface, to further generate a noise texture for the fluid surface, and combined the shaded fluid surface with noise texture to render an image of the fluid surface.

In an embodiment exemplified by FIG. 8, the processor circuitry is operable to perform operations 502-508, or operations 602-606, or operations 702-706 to render a fluid surface, to further provide a background image of the fluid surface, and to combine the fluid surface with background image to render an image of the fluid surface.

Several advantages of the invention are realized in that (i) rendering speed versus image quality can be varied, (ii) processing, rendering and shading can be performed directly on graphics hardware, (iii) the screen-space curvature flow technique disclosed herein avoids prevents the rendered fluid surface from appearing with a blobby or jelly-like consistency, (iv) the rendering technique does not rely upon polygonization and thus does not suffer from artifacts associated therewith, (v) the method is easy to implement requiring a few passes of a fragment shader and intermediate render targets, and (vi) the method has inherent view-dependent level-of-detail, as the method is based on a grid on screen-space.

As readily appreciated by those skilled in the art, the described processes and operations may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indices (if any) included in the claims serve to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for rendering an image of a fluid surface composed of a plurality of particles, the method comprising:
   (i) generating, by processor circuitry, a depth image of a plurality of particles forming a fluid surface, each particle i of the plurality of particles corresponding to a pixel of a plurality of pixels included in the depth image, wherein each particle is rendered as a screen-oriented quad;
   (ii) smoothing the depth image to generate a smoothed depth image;
   (iii) from the smoothed depth image, determining a smoothed surface position and a smoothed surface normal for each of the plurality of pixels included within the smoothed depth image; and
   (iv) rendering a shaded surface of the fluid as a function of the smoothed surface positions and the smoothed surface normals,
   wherein a fluid thickness value (T) for each pixel is computed according to the equation:

$$T(x, y) = \sum_{i=0}^{n} d\left(\frac{x - x_i}{\sigma_i}, \frac{y - y_i}{\sigma_i}\right)$$

where d is a kernel function $d(x,y)=\sqrt{1-x^2-y^2}$ in which x and y vary between −1 and +1 over a two dimensional screen space position of the particle and (x,y) is a particle position, n is the number of particles the computation is summed over, where $x_i$ and $y_i$ defines the projected position of the particle, and where $\sigma_i$ is a projected size of the particle.

2. The method of claim 1, wherein (i) comprises varying a depth of each screen-oriented quad over the two dimensional screen space position of the particle.

3. The method of claim 1, wherein depth values of each screen-oriented quad are computed according to the equation:

$$d(x,y)=\sqrt{1-x^2-y^2}$$

in which (x,y) is the particle position, and x and y vary between −1 and +1 over the two dimensional screen space position within the particle.

4. The method of claim 1, wherein (ii) comprises applying bilateral Gaussian filtering to the depth image.

5. The method of claim 1, wherein (iv) comprises rendering the shaded surface of the fluid as a function of the computed fluid thickness values.

6. The method of claim 1, further comprising:
   generating a noise texture for the fluid surface; and
   compositing the noise texture with the shaded surface of the fluid to form an image of the fluid surface.

7. The method of claim 1, further comprising:
   providing a background image of the fluid surface; and
   compositing the background image with the shaded surface of the fluid to form an image of the fluid surface.

8. A processor operable to render an image of a fluid surface composed of a plurality of particles, the processor comprising:
   (i) processor circuitry operable to generate a depth image of a plurality of particles forming a fluid surface, each particle i of the plurality of particles corresponding to a pixel of a plurality of pixels included in the depth image, wherein each particle is rendered as a screen-oriented quad;
   (ii) processor circuitry operable to smooth the depth image to generate a smoothed depth image;
   (iii) processor circuitry operable to determine, from the smoothed depth image, a smoothed surface position and a smoothed surface normal for each of the plurality of pixels included within the smoothed depth image; and
   (iv) processor circuitry operable to render a shaded surface of the fluid as a function of the smoothed surface positions and the smoothed surface normals,
   wherein a fluid thickness value (T) for each pixel is computed according to the equation:

$$T(x, y) = \sum_{i=0}^{n} d\left(\frac{x - x_i}{\sigma_i}, \frac{y - y_i}{\sigma_i}\right)$$

where d is a kernel function $d(x,y)=\sqrt{1-x^2-y^2}$ in which x and y vary between −1 and +1 over a two dimensional screen space position of the particle and (x,y) is a particle position, n is the number of particles the computation is summed over, where $x_i$ and $y_i$ defines the projected position of the particle, and where $\sigma_i$ is a projected size of the particle.

9. The processor of claim 8, wherein (i) is operable to vary a depth of each screen-oriented quad over the two dimensional screen space position of the particle.

10. The processor of claim 8, wherein depth values of each screen-oriented quad are computed according to the equation:

$$d(x,y)=\sqrt{1-x^2-y^2}$$

in which (x,y) is the particle position, and x and y vary between −1 and +1 over the two dimensional screen space position within the particle.

11. The processor of claim 8, wherein (ii) is operable to apply a bilateral Gaussian filtering to the depth image.

12. The processor of claim 8, wherein (iv) is operable to render the shaded surface of the fluid as a function of the computed fluid thickness values.

13. The processor of claim 8, further comprising:
processor circuitry operable to generate a noise texture for the fluid surface; and
processor circuitry operable to combine the noise texture with the shaded surface of the fluid to form an image of the fluid surface.

14. The processor of claim 8, further comprising:
processor circuitry operable to provide a background image of the fluid surface; and
processor circuitry operable to combine the background image with the shaded surface of the fluid to form an image of the fluid surface.

15. A computer program product, resident on a non-transitory computer readable medium, operable to store executable instructions for rendering an image of a fluid surface composed of a plurality of particles, the computer program product comprising:
(i) instruction code to generate a depth image of a plurality of particles forming a fluid surface, each particle i of the plurality of particles corresponding to a pixel of a plurality of pixels included in the depth image, wherein each particle is rendered as a screen-oriented quad;
(ii) instruction code to smooth the depth image to generate a smoothed depth image;
(iii) instruction code to determine, from the smoothed depth image, a smoothed surface position and a smoothed surface normal for each of the plurality of pixels included within the smoothed depth image; and
(iv) instruction code to render a shaded surface of the fluid as a function of the smoothed surface positions and the smoothed surface normals,
wherein a fluid thickness value (T) for each pixel is computed according to the equation:

$$T(x, y) = \sum_{i=0}^{n} d\left(\frac{x - x_i}{\sigma_i}, \frac{y - y_i}{\sigma_i}\right)$$

where d is a kernel function $d(x,y)=\sqrt{1-x^2-y^2}$ in which x and y vary between −1 and +1 over a two dimensional screen space position of the particle and (x,y) is a particle position, n is the number of particles the computation is summed over, where $x_i$ and $y_i$ defines the projected position of the particle, and where $\sigma_i$ is a projected size of the particle.

16. The computer program product of claim 15, wherein (i) includes instruction code to vary a depth of each screen-oriented quad over the two dimensional screen space position of the particle.

17. The computer program product of claim 15, wherein depth values of each screen-oriented quad are computed according to the equation:

$$d(x,y)=\sqrt{1-x^2-y^2}$$

in which (x,y) is the particle position, and x and y vary between −1 and +1 over the two dimensional screen space position within the particle.

18. The computer program product of claim 15, wherein (ii) includes instruction code to apply a bilateral Gaussian filtering to the depth image.

19. The computer program product of claim 15, wherein (iv) includes instruction code to render the shaded surface of the fluid as a function of computed fluid thickness values.

20. The computer program product of claim 15, further comprising:
instruction code to generate a noise texture for the fluid surface; and
instruction code to combine the noise texture with the shaded surface of the fluid to form an image of the fluid surface.

21. The computer program product of claim 15, further comprising:
instruction code to provide a background image of the fluid surface; and
instruction code to combine the background image with the shaded surface of the fluid to form an image of the fluid surface.

* * * * *